United States Patent [19]

Kanamori et al.

[11] Patent Number: 4,627,866
[45] Date of Patent: Dec. 9, 1986

[54] METHOD FOR PRODUCING OPTICAL FIBER PREFORM

[75] Inventors: Hiroo Kanamori; Gotaro Tanaka, both of Yokohama; Kazunori Chida, Mito, all of Japan

[73] Assignees: Sumitomo Electric Industries Ltd., Osaka; Nippon Telegraph and Telephone Public Corporation, Tokyo, both of Japan

[21] Appl. No.: 679,030

[22] Filed: Dec. 6, 1984

[51] Int. Cl.⁴ .......................................... C03B 37/018
[52] U.S. Cl. ............................... 65/3.12; 65/DIG. 16
[58] Field of Search ............... 65/DIG. 16, 3.12, 18.2

[56] References Cited

U.S. PATENT DOCUMENTS

| | | | |
|---|---|---|---|
| 4,345,928 | 8/1982 | Kawachi | 65/18.2 |
| 4,406,680 | 9/1983 | Edahiro | 65/18.2 |

FOREIGN PATENT DOCUMENTS

| | | | |
|---|---|---|---|
| 55-144432 | 11/1980 | Japan | 65/3.12 |
| 58-02171 | 1/1983 | Japan | 65/3.12 |
| 59-137333 | 8/1984 | Japan | 65/DIG. 16 |
| 2056966 | 3/1981 | United Kingdom | 65/18.2 |

Primary Examiner—Kenneth M. Schor
Attorney, Agent, or Firm—Cushman, Darby & Cushman

[57] ABSTRACT

A method for producing an optical fiber preform comprising injecting a glass raw material, a gaseous fluorine-containing material and oxygen gas from a first nozzle, inactive gas from a second nozzle which surrounds the first nozzle and hydrogen gas from a third nozzle which surrounds the second nozzle, flame hydrolyzing the glass raw material to synthesis fine glass particles and depositing the fine glass particles on a tip of a rotating seed rod to produce the optical fiber preform containing fluorine.

5 Claims, 5 Drawing Figures

10mm

10mm

10mm

METHOD FOR PRODUCING OPTICAL FIBER PREFORM

FIELD OF THE INVENTION

The present invention relates to a method for producing an optical fiber preform. More particularly, it relates to a method for producing an optical fiber preform containing fluorine.

BACKGROUND OF THE INVENTION

Fluorine in a silica glass lowers its refractive index and makes it possible to produce optical fibers having various distribution of refractive indexes and improved light transmission characteristics, for example, an optical fiber having a large difference of refractive index between a core and a cladding and thus a large number of aperture and an optical fiber comprising a core made of pure silica glass and having improved resistance against radiation.

There are known several methods for producing a silica glass type optical fiber preform containing fluorine including a modified chemical vapor deposition (MCVD) method and a plasma outside vapor deposition (POVD) method. Generally, from a preform produced by these method, only about 10 Km of an optical fiber can be drawn. Further, since the production rates of these methods are low, they are not suitable for mass production of the optical fiber preform and thus the optical fiber.

The vapor phase axial deposition method (hereinafter referred to as "VAD" method) can afford an optical fiber preform from which an optical fiber having longer length is drawn. However, the optical fiber preform containing fluorine is rarely produced by the VAD method, since if a fluorine-containing material is simply mixed with gaseous $SiCl_4$ which is a raw material of $SiO_2$, there arise many drawbacks such that fluorine is not effectively added to silica glass, the produced preform tends to crack and a deposition rate of fine glass particles is deteriorated.

SUMMARY OF THE INVENTION

One object of the present invention is to provide an optical fiber preform, particularly a porous optical fiber preform containing fluorine.

Another object of the present invention is to provide a method for producing an optical fiber preform containing fluorine by the VAD method.

Accordingly, the present invention provides a method for producing an optical fiber preform comprising injecting a glass raw material, a gaseous fluorine-containing material and oxygen gas from a first nozzle, inactive gas from a second nozzle which surrounds the first nozzle and hydrogen gas from a third nozzle which surrounds the second nozzle, flame hydrolyzing the glass raw material to synthesize fine glass particles and depositing the fine glass particles on a tip of a rotating seed rod to produce the optical fiber preform containing fluorine.

Further, the present invention provides a method for producing an optical fiber preform comprising injecting at least one of a glass raw material, a gaseous fluorine-containing material and oxygen gas from a first nozzle, the rest of them and optionally at least one material which is injected from the first nozzle from a second nozzle which surrounds the first nozzle, inactive gas from a third nozzle which surrounds the second nozzle and hydrogen gas form a fourth nozzle which surrounds the third nozzle, flame hydrolyzing the glass raw material to synthesize fine glass particles and depositing the fine glass particles on a tip of a rotating seed rod to produce the optical fiber preform containing fluorine.

DETAILED DESCRIPTION OF THE DRAWINGS

In the present invention, a fluorine-containing material is preferably selected from gaseous fluorinated compounds which are easily available. The fluorine-containing material is injected together with a gaseous glass raw material (eg. $SiCl_4$, $GeCl_4$, etc.), hydrogen gas, oxygen gas and inactive gas from a multi-nozzle burner (hereinafter referred to as "burner") for synthesizing fine glass particles, and the materials are flame hydrolyzed in an oxyhydrogen flame to produce a porous preform containing fluorine.

The first characteristic of the invention resides in that injecting mode of the gaseous materials from the burner is arranged so that the fine glass particles are synthesized in the flame under higher oxygen partial pressure. The second characteristic of the invention resides in that, in some injecting modes, the fluorine-containing material and the glass raw materials can be separately injected from the burner.

It has been found that when the fine glass particles are synthesized under higher oxygen partial pressure, the fluorine-containing material is thoroughly decomposed and enough fine glass particles are synthesized and further fluorine is effectively added to the produced preform.

If the oxygen partial pressure is reduced by decreasing a flow rate of oxygen gas, component atoms of the fluorine-containing material such as carbon atoms are not completely oxidized during the decomposition of the fluorine-containing material and deposit on the porous preform. In addition, the synthesizing rate of the fine glass particles is decreased.

For example, these characteristics mentioned above will be shown by the following experiments.

Figure 1:
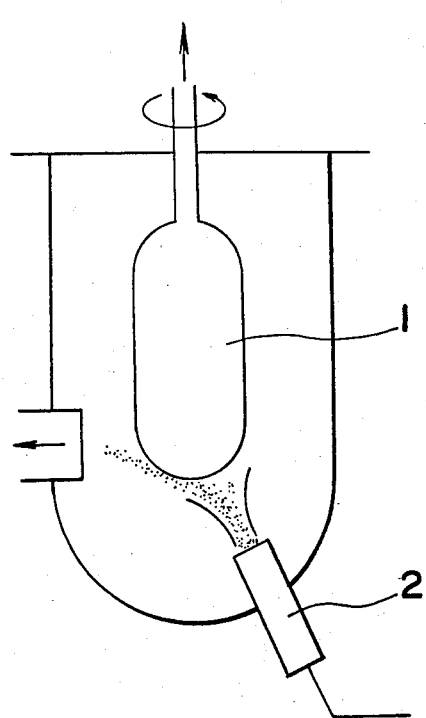
FIG. 1 is a schematic view illustrating the VAD method.
Figure 2:
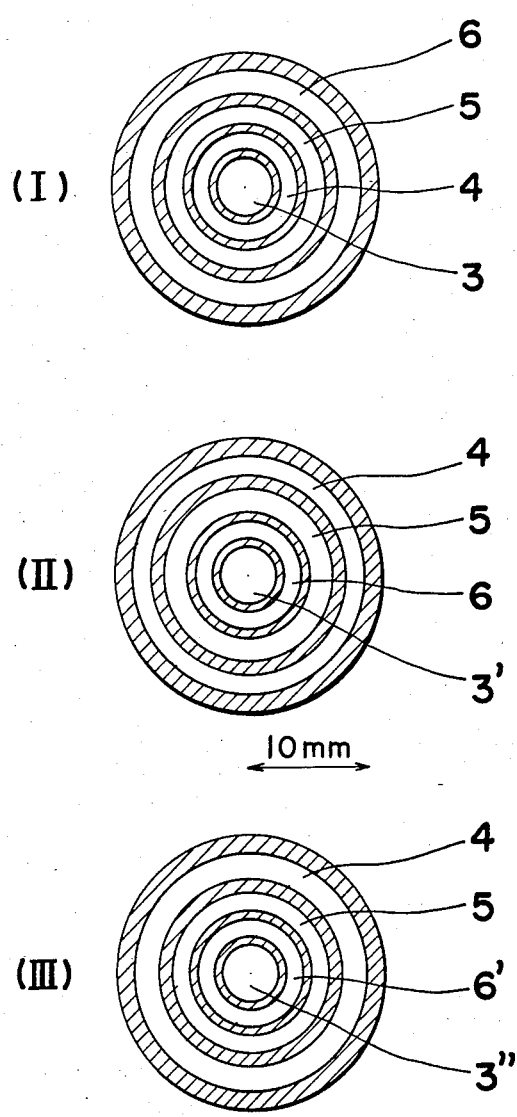
FIGS. 2 to 5 show examples of layout of the nozzles of a burner used in the method of the invention.

The preform is produced according to a conventional VAD method illustrated in FIG. 1 in which numeral 1 denotes a produced preform and numeral 2 denotes a burner but using a four-nozzle burner a cross section of which is shown in FIG. 2. As the fluorine-containing material, $CCl_2F_2$ is used. A preform is produced under various conditions as follows:

Experiment No. 1

First nozzle:
    $SiCl_4$, 250 ml/sec.
    $CCl_2F_2$, 250 ml/sec.
Second nozzle: $H_2$, 4,000 ml/sec.
Third nozzle: $N_2$, 1,500 ml/sec.
Fourth nozzle: $O_2$, 6,400 ml/sec.

Experiment No. 2

First nozzle:
    $SiCl_4$, 250 ml/sec.
    $CCl_2F_2$, 83 ml/sec.

Second nozzle: $H_2$, 4,000 ml/sec.
Third nozzle: $N_2$, 1,500 ml/sec.
Fourth nozzle: $O_2$, 8,000 ml/sec.

Experiment No. 3

First nozzle:
 $SiCl_4$, 250 ml/sec.
 $CCl_2F_2$, 125 ml/sec.
Second nozzle: $H_2$, 4,000 ml/sec.
Third nozzle: $N_2$, 1,500 ml/sec.
Fourth nozzle: $O_2$, 8,000 ml/sec.

Experiment No. 4

First nozzle:
 $SiCl_4$, 250 ml/sec.
 $CCl_2F_2$, 250 ml/sec.
 $O_2$, 200 ml/sec.
Second nozzle: $O_2$, 1,800 ml/sec.
Third nozzle: $N_2$, 1,500 ml/sec.
Fourth nozzle: $H_2$, 4,000 ml/sec.
which ratios are shown in Table 1. The thus produced porous preform is sintered to converted it to a transparent preform by a per se conventional method at a temperature of 1,600° C. in a stream of helium at a flow rate of 5 liters/min. Refractive index of the transparent preform is measured. Layout of the nozzles is shown in FIG. 2, in which a nozzle 3 is for $SiCl_4$ and $CCl_2F_2$, a nozzle 3' is for $SiCl_4$, $CCl_2F_2$ and oxygen gas, a nozzle 4 is for hydrogen gas, a nozzle 5 is for an inactive gas and a nozzle 6 is for oxygen gas.

TABLE 1

| Exp. No. | Layout of nozzles | $O_2$ flow rate $H_2$ flow rate | $CCl_2F_2$ flow rate $SiCl_4$ flow rate | Refractive index difference |
|---|---|---|---|---|
| 1 | [I] | 1.6 | 1.0 | −0.09 |
| 2 | [I] | 2.0 | 0.33 | −0.075 |
| 3 | [I] | 2.0 | 0.5 | −0.09 |
| 4 | [II] | 0.5 | 1.0 | −0.13 |

The refractive index differences shown in Table 1 indicate followings:

Comparing the result of Experiment No. 1 in which the flow rate of oxygen gas is low and the flow rate of $CCl_2F_2$ is high and that of Experiment No. 3 in which the flow rate of oxygen gas is high and the flow rate of $CCl_2F_2$ is low, substantially the same amount of fluorine is added and it is concluded that when the flow rate of oxygen gas is high, fluorine is effectively added even at a low flow rate of $CCl_2F_2$. Comparing the results of Experiment Nos. 1 and 4 in which the flow rate of $CCl_2F_2$ is same but the layout of the nozzles is different, more fluorine is added in Experiment No. 4 than in Experiment No. 1. These results clearly indicate that it is advantageous to synthesize the fine glass particles by flame hydrolysis under higher oxygen partial pressure in order to effectively add fluorine. When the glass raw materials and oxygen gas are injected from the adjacent nozzles as in the layout [II] in FIG. 2 or from the same nozzle, fluorine is more effectively added. When the nozzle for hydrogen gas and the nozzle for oxygen gas are adjacently arranged, oxyhydrogen flame is formed very closely to the exits of the nozzles so that the tips of the nozzles tend to be heated to a very high temperature and deteriorated. In order to prevent such deterioration of the nozzles, a nozzle for inactive gas is preferably positioned between the above two nozzles.

By separately injecting the glass raw materials and the fluorine-containing material, the deposition rate of the fine glass particles is greatly improved, which is clear from the results shown in Table 2.

TABLE 2

| Exp. No. | Layout of nozzles | Refractive index difference | Ratio of deposition rate of fine glass particles |
|---|---|---|---|
| 4 | [II] | −0.13 | 1.0 |
| 5 | [III] | −0.13 | 1.2 |

In the layout [III] of the nozzles in FIG. 2, a nozzle 3" is for $SiCl_4$ and oxygen gas and a nozzle 6' is for $CCl_2F_2$ and oxygen gas. In Experiment 5, the flow rates of the gasses are as follows:

First nozzle:
 $SiCl_4$, 250 ml/sec.
 $O_2$, 200 ml/sec.
Second nozzle:
 $O_2$, 1,800 ml/sec.
 $CCl_2F_2$, 250 ml/sec.
Third nozzle: $N_2$, 1,500 ml/sec.
Fourth nozzle: $H_2$, 4,000 ml/sec.

These results may be attributed to that when $SiCl_4$ and $CCl_2F_2$ are simultaneously injected, formation of $SiO_2$ nuclei is restricted by formation of $SiF_4$ and the like while when they are separately injected, the $SiO_2$ nuclei are advantageously formed so that the deposition of solid phase is facilitated.

Figure 3:
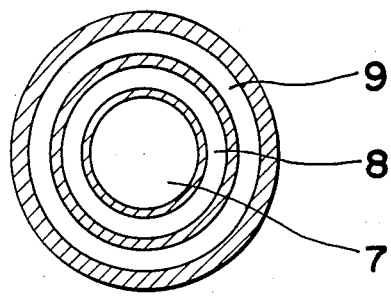

In order to synthesize the fine glass particles at higher oxygen partial pressure under the above described conditions, a layout of the nozzles as shown in FIG. 3 may be preferably used. The multi-nozzle burner of FIG. 3 has a center nozzle 7 for the glass raw material, the fluorine-containing material and oxygen gas, a nozzle 8 for inactive gas which surrounds the nozzle 7 and a nozzle 9 for hydrogen gas which surrounds the nozzle 8.

Figure 4:
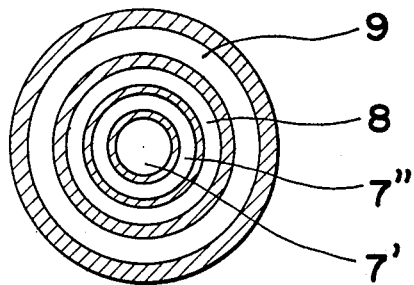

A burner shown in FIG. 4 is a modification of the burner of FIG. 3, in which the central nozzle 7 is divided into two, namely a nozzle 7' for at least one of the glass raw material, the fluorine-containing material and oxygen gas and a nozzle 7' for rest of them and optionally at least one material which is injected from the first nozzle. The nozzles 7' and 7" are surrounded by the nozzle 8 and further the nozzle 9 as in FIG. 3. By the increase of the number of the nozzles for the glass raw material and oxygen gas, it is possible to produce a stable porous preform since the synthesis of the fine glass particles and their flow rate as well as the distribution of their spatial concentration can be controlled.

In addition to the burners of FIGS. 3 and 4, the burner of FIG. 2 [III] is preferred.

Figure 5:
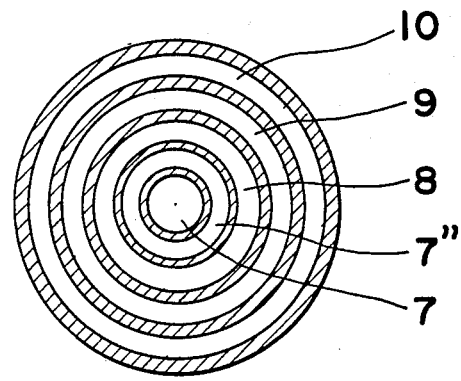

When hydrogen gas is injected from the outermost nozzle, the flame is not sufficiently concentrated and under some conditions, the porous preform is not effectively heated so that a preform having a low bulk density is produced which may result in cracking and/or runaway of the produced porous preform. In addition, the fluctuation of the flame is augmented so that the stable porous preform is not produced. In such cases, a nozzle 10 for inactive gas is provided around the nozzle 9 as shown in FIG. 5 in order to improve the concentration of the flame and to diminish the fluctuation of the flame.

Specific examples of the fluorine-containing material are $CCl_2F_2$, $CF_4$, $SF_6$, $C_2F_6$, $SiF_4$, etc. The amount of fluorine added is increased as the flow rate of the fluorine-containing material is increased. Maximum flow rate may be limited since too large flow rate causes several troubles such as cracking of the produced preform, asymmetry of the preform around its axis, etc. Therefore, a fluorine-containing material containing more fluorine atoms per molecule is more preferred, and $SiF_4$, $C_2F_6$, $CF_4$ and $SF_6$ are preferred.

Specific examples of the inactive gas are argon, helium, nitrogen, etc.

The flow rates of the glass raw material, the fluorine-containing material, oxygen gas and hydrogen gas are as follows:

Glass raw material 200-500 ml/sec.
preferably 300-400 ml/sec.

Fluorine-containing material 200-500 ml/sec.
preferably 300-400 ml/sec.

Oxygen gas 4,000-12,000 ml/sec.
preferably 6,000-8,000 ml/sec.

Hydrogen gas 4,000-15,000 ml/sec.
preferably 5,000-8,000 ml/sec.

Usually, the ratio of oxygen flow rate and hydrogen flow rate is from 0.5 to 2, preferably from 0.5 to 1. The ratio of the flow rates of the fluorine-containing material and of the glass raw material is from 0.5 to 1.5, preferably from 0.7 to 1.

The diameter of each nozzle varies with other conditions such as the flow rates of the gasses. Figures show typical diameters of the nozzles, but the present invention is not limited to these diameters.

What is claimed is:

1. A method for producing an optical fiber preform comprising the steps of:

injecting an oxide glass-forming raw material and oxygen gas from a primary nozzle, a gaseous fluorine-containing material and oxygen gas from a first nozzle which surrounds said primary nozzle or is surrounded by said primary nozzle, inert gas from a second nozzle which surrounds said first nozzle and said primary nozzle, and hydrogen gas from a third nozzle which surrounds said second nozzle, flame hydrolyzing the glass-forming raw material to synthesize glass soot particles, depositing the glass soot particles on a tip of a rotating seed rod until an optical fiber preform is formed, and fusing the optical fiber preform to produce an oxide glass optical fiber preform containing fluorine.

2. A method according to claim 1, wherein a fourth nozzle is provided around the third nozzle to inject inert gas.

3. A method for producing an optical fiber preform comprising steps of:

injecting an oxide glass-forming raw material and oxygen gas simultaneously from a centrally positioned first nozzle, a gaseous fluorine-containing material from a second nozzle which surrounds said centrally positioned nozzle, inert gas from a third nozzle which surrounds said second nozzle, and hydrogen gas from a fourth nozzle which surrounds said third nozzle, flame hydrolyzing the glass-forming raw material to synthesize glass soot particles, depositing the glass soot particles on a tip of a rotating seed rod until an optical fiber preform is formed, and fusing the optical fiber preform to produce an oxide glass optical fiber preform containing fluorine.

4. A method according to claim 3, wherein a fifth nozzle is provided around the fourth nozzle to inject inert gas.

5. A method according to claims 1 or 3, wherein the fluorine-containing material is at least one selected from the group consisting of $SF_6$, $CF_4$, $C_2F_6$, $SiF_4$ and $CCl_2F_2$.

* * * * *